(No Model.)
J. G. GREENE.
CUTTING MECHANISM FOR BUTTON HOLE SEWING MACHINES.
No. 376,475. Patented Jan. 17, 1888.
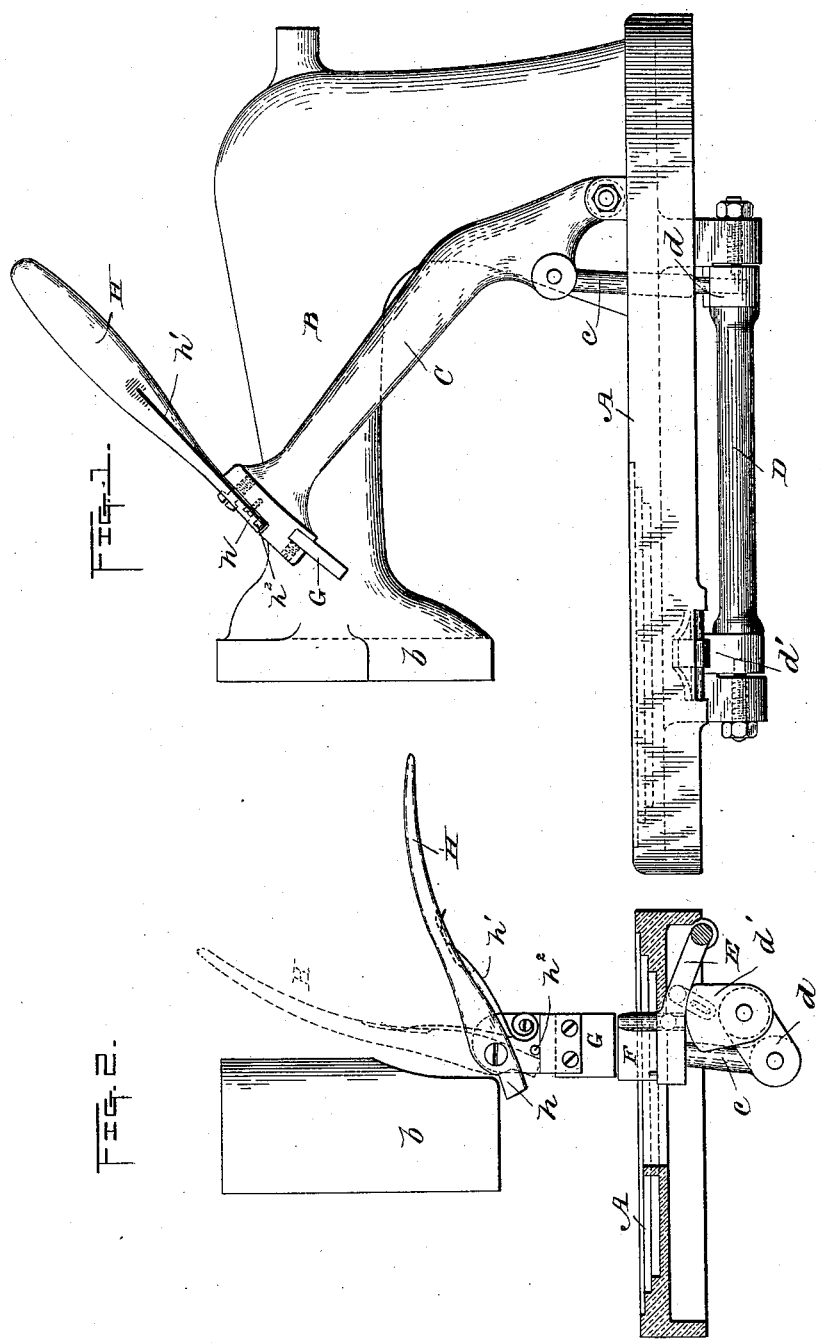

UNITED STATES PATENT OFFICE.

JAMES G. GREENE, OF ELIZABETH, NEW JERSEY, ASSIGNOR TO THE SINGER MANUFACTURING COMPANY OF NEW JERSEY.

CUTTING MECHANISM FOR BUTTON-HOLE SEWING-MACHINES.

SPECIFICATION forming part of Letters Patent No. 376,475, dated January 17, 1888.

Application filed September 10, 1887. Serial No. 249,342. (No model.)

*To all whom it may concern:*

Be it known that I, JAMES G. GREENE, a citizen of the United States, residing at Elizabeth, in the county of Union and State of New Jersey, have invented certain new and useful Improvements in Cutting Mechanisms for Button-Hole Sewing-Machines, of which the following is a specification, reference being had therein to the accompanying drawings.

United States Patent No. 322,428, to Philip Diehl, dated July 21, 1885, shows and describes a button-hole-cutting mechanism in which the button-holes are cut by a striking cutter, which is caused to descend quickly and forcibly by the movement of a handle attached to a rock-shaft connected with the cutting-lever. Such a cutting mechanism has, however, been found to be objectionable for the reason that the shock or jar of the striking cutter or cutting-lever loosens the screws and other parts of the button-hole-stitching machine to which the cutter is attached, and thereby impairs the efficiency of the machine, besides being destructive to the knife.

The object of my invention is to obviate the objections to the button-hole-cutting mechanism above referred to, this object being attained by providing the lever which carries the cutter or cutting-block with a hand-lever which is arranged to impinge beneath the lower end of the head at the forward part of the bracket-arm of the sewing-machine in such a manner that the cutting-lever may be forced downward by the operator to cut the button-holes by a gradual but powerful pressure.

In the accompanying drawings, Figure 1 is a side view of a button-hole sewing-machine with my invention applied thereto, and Fig. 2 is an end view of the same.

A denotes the work-plate of the button-hole sewing-machine, B the bracket-arm thereof, and $b$ the "head" at the forward end of the latter.

I have preferred to illustrate my invention in connection with a button-hole-cutting mechanism which in its general features is essentially the same as that shown by the patent to Diehl, above referred to, and to which patent reference may be had for a full understanding of such details of the cutting mechanism forming no part of my invention as are not herein shown.

C is the cutting-lever, the shaft of which is pivoted to the work-plate A, and is provided with a counterbalancing-spring, (not herein shown,) to lift the said lever after a button-hole has been cut and to hold it in an elevated position out of the way of the operator. The cutting-lever is connected by a link, $c$, to an arm, $d$, of a rock-shaft, D, beneath the work-plate A, the said rock-shaft having at its forward end a cam, $d'$, arranged beneath an arm or lever, E, pivoted to the work-plate. In the present instance I have shown the cutting-knife or blade F as being carried by the lever E and the cutting-block G as being attached to the lever C; but this arrangement of these two parts is immaterial, as the positions thereof might be reversed, as shown in the patent above referred to.

Pivoted to the forward end of the lever C and opposite to the head $b$ is a hand-lever, H, the short arm $h$ of which is arranged to come beneath the lower end of the said head when the said hand-lever is pressed downward by the operator, as shown in full lines in Fig. 2, a spring, $h'$, being provided to throw the said hand-lever up to the position shown in dotted lines in the said figure when not in use, and the upward movement of the said lever being limited by a pin, $h^2$, or other suitable stop.

In the use of my invention the fabric in which a button-hole is to be cut is placed in position above the cutter or blade F, such fabric being, as usual, held in the work-clamp. The operator then takes hold of the lever C and moves it downward, and as the said lever is connected with the rock-shaft D the latter is simultaneously turned to cause the cam $d'$ to lift the lever E and its attached cutter or blade F to the position shown in Fig. 2. The operator then presses down on the hand-lever H with a proper force to cut the button-hole, and the hand and cutting levers are then released and are returned to their normal positions by their lifting-springs. The strong leverage afforded by the hand-lever enables the operator to cut the heaviest material with the greatest ease, and in cutting button-holes in thin material the cutting-lever may be moved quickly downward by the hand of the operator to strike a light blow sufficient to cut such material without producing sufficient jar to damage the machine or knife; or in cutting heavy material the button-hole may be partly cut by a light blow of the cutting-lever, and the cutting operation finished by the hand-lever without injury to the machine.

I do not wish to be understood as limiting my invention in its use to the particular form of cutting mechanism in connection with which I have herein illustrated it, as it is obvious that a hand-lever arranged to impinge against some part of the head of the machine may be used in connection with other forms of button-hole-cutting mechanisms than that herein shown without departing from the essential feature of my invention.

Having thus described my invention, I claim and desire to secure by Letters Patent—

1. In a button-hole sewing-machine, the combination, with the bracket-arm thereof, a cutter or blade, a cutting-block, and a cutting-lever, of a hand-lever pivoted to the said cutting-lever and arranged to impinge against the head at the forward end of the said bracket-arm.

2. In a button-hole sewing-machine, the combination, with the bracket-arm thereof, a cutter or blade, a cutting-block, and a cutting-lever, of a hand-lever pivoted to the forward end of the said cutting-lever and arranged to impinge against the head at the forward end of the said bracket-arm, a spring for lifting the said hand-lever and holding it elevated, and a stop for limiting the upward movement of the said lever by the said spring.

3. The combination, with the work-plate A, bracket-arm B and its head $b$, of the cutting-lever C, the rock-shaft D, connected with the said lever and provided with the cam $d'$, the lever E, a cutter or blade, a cutting-block, and a hand-lever, H, pivoted to the lever C and arranged to impinge beneath the said head $b$ when a button-hole is to be cut.

In testimony whereof I affix my signature in presence of two witnesses.

JAMES G. GREENE.

Witnesses:
 L. B. MILLER,
 JOSEPH HOUGHTON.